United States Patent [19]
Posnansky

[11] 3,934,479
[45] Jan. 27, 1976

[54] MEASUREMENT APPARATUS INFLUENCED BY DISTURBING AMBIENT TEMPERATURE FLUCTUATIONS

[75] Inventor: Mario Posnansky, Horgen, Switzerland

[73] Assignee: Haenni & Cie Aktiengesellschaft, Jegenstorf, Switzerland

[22] Filed: Dec. 3, 1973

[21] Appl. No.: 421,272

[30] Foreign Application Priority Data
Dec. 6, 1972   Switzerland......................... 17732/72
Nov. 9, 1973   Switzerland......................... 15757/73

[52] U.S. Cl. .................. 73/368.6; 73/362.5; 73/418
[51] Int. Cl.² ........................................... G01K 5/36
[58] Field of Search ... 73/362.5, 368.6, 418, 432 A, 73/393, 61.1 R

[56] References Cited
UNITED STATES PATENTS
2,053,974   9/1936   Smith................................. 73/368.6
2,088,032   7/1937   Noble................................ 73/362.5
3,411,360   11/1968  Denner.............................. 73/362.5
3,808,893   5/1974   Jinno et al. ................... 73/61.1 R X FOREIGN PATENTS OR APPLICATIONS
277,326   7/1970   U.S.S.R............................... 73/418
841,798   6/1952   Germany.............................. 73/418

Primary Examiner—Jerry W. Myracle
Assistant Examiner—Joseph W. Roskos
Attorney, Agent, or Firm—Werner W. Kleeman

[57] ABSTRACT

A measurement apparatus influenced by disturbing ambient temperature variations or fluctuations, said measurement apparatus having a limited volume filled with a medium subjected to such temperature fluctuations. Further, there is provided a compensation element which, under the influence of such disturbing temperature fluctuations, alters the size of a compartment which also contains the medium and thus also alters the aforementioned volume. The dimensions and the coefficient of thermal expansion of the compensation element, while taking into account the coefficient of thermal expansion and the quantity of medium contained in such compartment, are chosen such that the influence of the disturbing temperature fluctuations on the apparatus is compensated.

15 Claims, 4 Drawing Figures

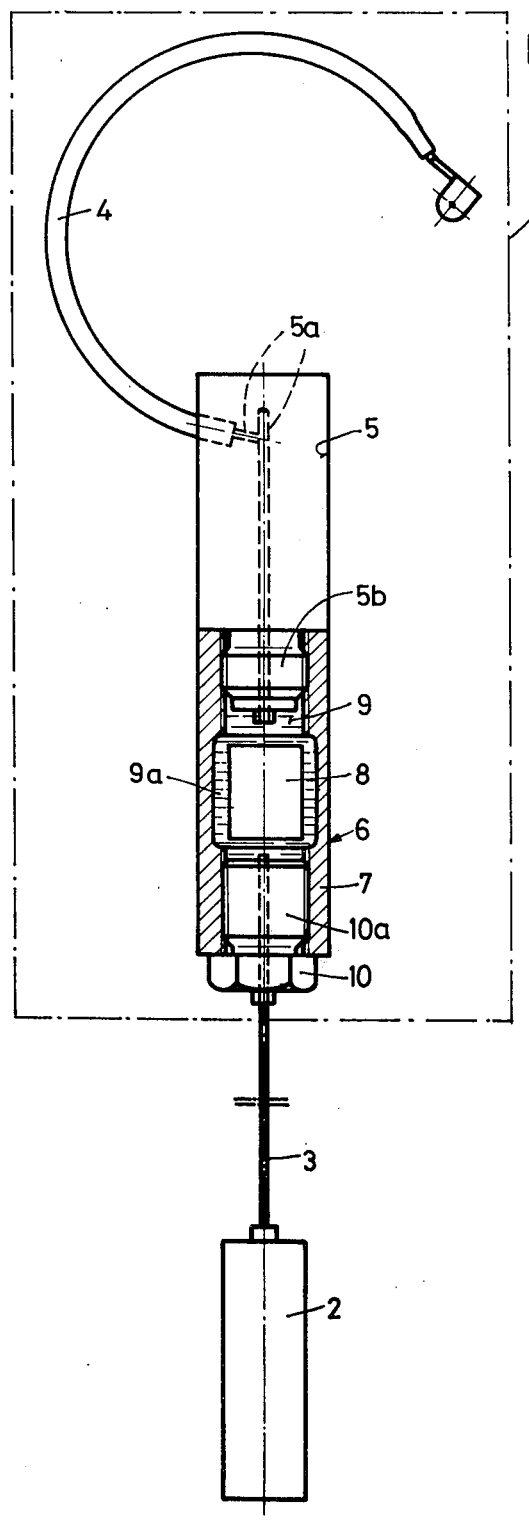
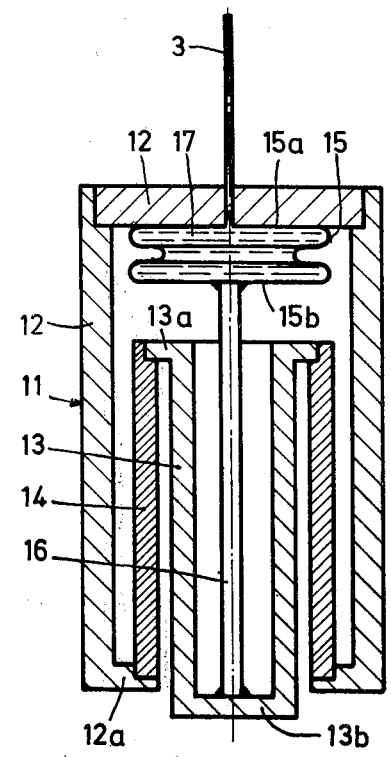
FIG.1
FIG.2

MEASUREMENT APPARATUS INFLUENCED BY DISTURBING AMBIENT TEMPERATURE FLUCTUATIONS

BACKGROUND OF THE INVENTION

The present invention relates to a new and improved construction of measurement apparatus which is influenced by disturbing ambient temperature fluctuations or variations and incorporating a limited volume which is filled with a medium subjected to such temperature fluctuations.

In a large number of mechanical temperature-measurement devices, the actual measurement of the temperature occurs by carrying out a pressure measurement. This pressure is produced in that a liquid, vapor, or gaseous medium enclosed within a temperature feeler, exerts a pressure upon the closed system either in accordance with its vapor pressure curve (with a liquid-vapor mixture), or however owing to its volume change (with liquids, gases and vapors). The system consists of an elastic measurement element, a transmission line and a feeler. The most frequently employed pressure measuring device is the so-called Bourdon-tube manometer or Bourdon gauge. This device is simple, inexpensive, accurate and reliable and is satisfactory for a great many applications. It is therefore obvious to use such device for temperature measurements by carrying out a pressure measurement. However, in practice it has been found that for this purpose there cannot be employed any standard Bourdon gauge. Quite to the contrary, there is employed as the measurement element a Bourdon-tube system possessing an extensively modified construction, there being provided a special construction which naturally has a decisive effect upon the price and therefore upon the market value of the device.

SUMMARY OF THE INVENTION

It is a primary object of the present invention to provide, among other things, the possibility, through the provision of a simple supplementary or auxiliary device, of using a conventional and therefore inexpensive manometer for temperature a measurement purposes.

Another object of the present invention relates to an improved construction of measurement device influenced by surrounding or ambient temperature fluctuations which is relatively simple in construction and design, economical to manufacture, extremely reliable in operation and not readily subject to breakdown or malfunction.

It is to be understood that the reasons that it is not simply possible to employ a Bourdon gauge for measuring the pressure resides in the fact that the volume of the Bourdon-tube system or gauge in comparison to the volume of the feeler is large. Consequently, the Bourdon tube system itself becomes a temperature feeler for fluctuations in the ambient temperature. These fluctuations cause a considerable falsification of the measurement value of the feeler temperature. Conventional techniques for compensating the ambient temperature, such as the use of bimetallic elements, are no longer sufficient. As a direct measure, it was therefore strived to make as small as possible the internal volume of the Bourdon-tube system. The most frequent case is where the Bourdon-tube system is rolled to be completely flat, so that there only remains a minimum volume. It is also known to employ filling bodies in order to reduce the volume remaining for the medium. Apart from the drawback of the special construction which is required, it is necessary to work with high pressures and also sealing problems must be solved. Additionally, there is present a finite measurement error since of course the volume can be reduced to null.

It is in this regard that the teachings of the present invention are intended to provide advantageous measures. The invention is based upon the following concepts:

If it is possible to find an element which renders ineffectual the "positive" volume expansion of the liquid in the Bourdon-type system in that there is produced a "negative" volume of the same size or magnitude into which the liquid can escape, then the system becomes independent of the volume of the Bourdon-tube system and therefore there also can be employed a conventional Bourdon-tube manometer or Bourdon gauge.

Now in order to implement the above objects and others which will become more readily apparent as the description proceeds, the apparatus of this development is manifested by the features that it encompasses a compensation element which, under the influence of such disturbing temperature fluctuations, changes the size of a compartment or space which also contains the medium, and wherein the dimensions and the coefficient of thermal expansion of the compensation element, while taking into account the coefficient of thermal expansion of the medium contained in the aforementioned compartment or space, are chosen such that the influence of the disturbing temperature fluctuations upon the apparatus is compensated.

According to one physical manifestation of the equipment, it is contemplated that the compensation element possesses a sleeve which completely or partially bounds the compartment or space; furthermore it is contemplated that in the sleeve there is arranged a filling body surrounded by the medium contained therein, and wherein such filling body with regard to its coefficient of thermal expansion and its size is matched or accommodated to the sleeve and the medium surrounding such sleeve in a manner that the influence of the disturbing temperature fluctuations upon the apparatus is compensated.

In the description to follow, there will be disclosed exemplary embodiments, each of which possesses a separate compensation element connected by means of a capillary tube at a Bourdon-tube pressure measuring element which is part of the apparatus. For many practical applications wherein there must also be taken into account the volume of a long capillary tube along with the volume subjected to the temperature fluctuations, such separate compensation element is advantageous.

A particularly simple and inexpensive constructional embodiment containing a sleeve and filling body, in which the limited volume subjected to the temperature fluctuations is completely contained in a Bourdon tube-pressure measuring element, in other words the volume of the capillary tube is negligibly small, can be realized according to a further aspect of the invention in that the Bourdon tube-pressure measuring element itself forms the sleeve belonging to the compensation element. With such construction there can be advantageously provided that for a Bourdon tube-pressure measuring element which is fabricated from steel with a coefficient of expansion of about $11.10^{-6}$mm/mm.°C and with the medium consisting of mercury, the filling body consists of a multiplicity of tablets formed of a metal alloy with a coefficient of expansion of about $1.10^{-6}$ mm/mm.°C, whereby its volume amounts to approximately 5/6 of the internal volume of the Bourdon tube-pressure measuring element. With such constructional embodiment there is realized a Bourdon tube manometer with a "built-in" thermal compensation. Apart from the advantage of the simplicity and inexpensiveness of the system, there is also realized for the manometer the advantage that disturbing temperature fluctuations are compensated at the location where they arise. The compensation therefore cannot lead or trail the temperature fluctuations and their measurement value-falsification effects.

There have already indeed been proposed Bourbon tube manometers in which the Bourdon tube, apart from containing the pressurized medium, also contains the filling body; such however only serve the purpose of reducing the quantity of the medium and therefore the magnitude of its disturbing influence. In contrast thereto with the construction proposed by the invention, the error is completely eliminated (compensated).

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is an elevational view of a complete apparatus designed according to the teachings of the present invention, partially shown in sectional view;

FIG. 2 is a longitudinal sectional view of a modified embodiment of temperature compensation element;

DETAILED DESCRIPTION OF THE PREFERRED EMBODIMENTS

Figure 3:
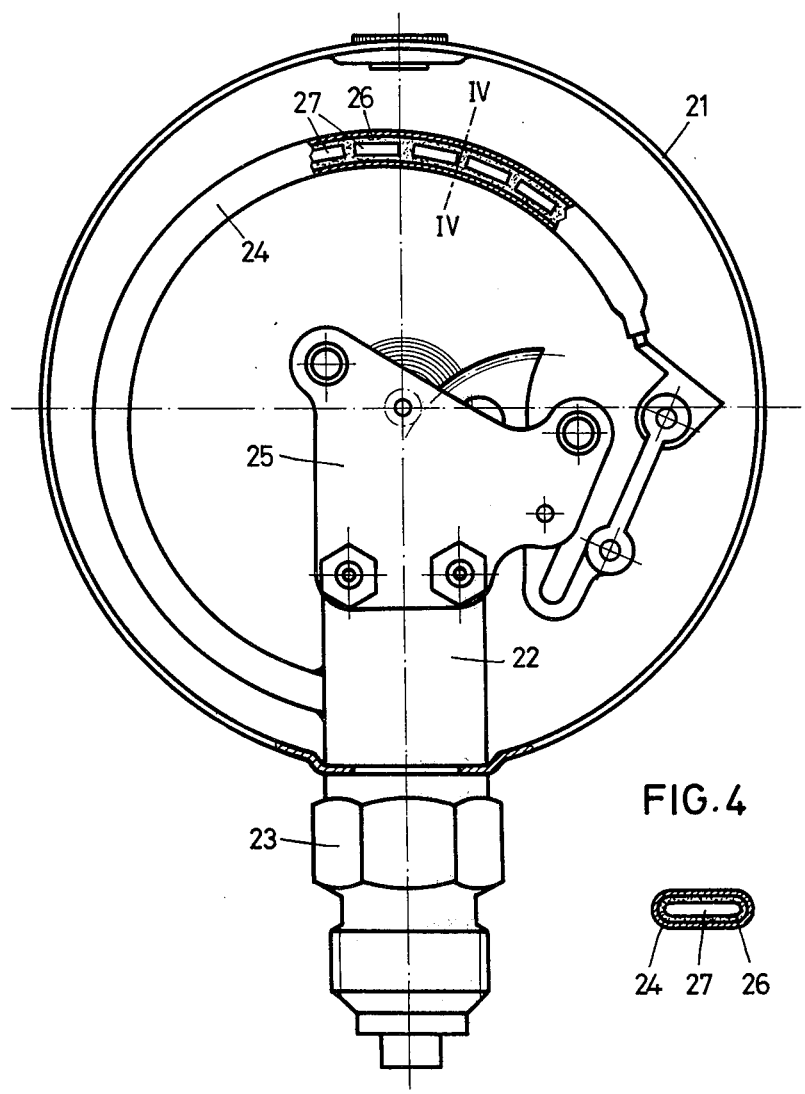
FIG. 3 is an elevational view, partially in section, of an exemplary embodiment of apparatus constituting a Bourdon tube-manometer with "built-in thermal compensation"

Describing now the drawings, in FIG. 1 the phantom line block 1 schematically designates the housing of a pressure measuring device or apparatus in which there occurs the disturbing changes of the ambient temperature. Reference numeral 2 designates an ambient temperature measurement feeler, a pressure feeler or a moisture or humidity measuring feeler or some other type of feeler which contains a medium (liquid, vapor or gas), the delivered pressure being in a certain relationship to the cooled measurement magnitude. Reference numeral 3 designates a capillary tube which is filled with the same medium as for instance the Bourdon tube 4 of a Bourdon tube manometer-measurement device of the pressure measuring apparatus. The interior of the Bourdon tube 4 and the capillary tube 3 is in free pressure transmitting communication with the internal space or compartment of the feeler 2; it has a volume V which is subjected to the disturbing ambient temperature fluctuations or variations. In lieu of the feeler 2 it would be possible to employ, for instance, a piston-cylinder unit operating with a pressurized liquid. The pressure transmission connection can consist in conventional manner of, for instance, a flexible membrane or diaphragm. In particular, when the feeler 2 constitutes a temperature measurement feeler, then the medium in this feeler, in the capillary tube 3 and in the bourdon tube 4, can be one and the same medium, for instance mercury or alcohol, in which case then the use of a membrane or diaphragm is no longer required.

The measurement unit of the measurement apparatus or device possessing the housing 1 incorporates in conventional manner a connection portion 5 which possesses the channel 5a filled with the medium subjected to the temperature fluctuations, the volume of which is part of the previously mentioned volume V.

At this volume V there is connected a temperature compensation element which has been collectively identified by reference numeral 6. In the embodiment according to FIG. 1 this element 6 comprises a sleeve 7, a filling body 8, the compensation medium 9a which surrounds the filling body 8 within the internal compartment or space 9 of the sleeve 7 and a nipple 10. The sleeve 7 is threaded so as to be pressure-tight seated at a threaded projection 5b of the connection portion 5 and upon a threaded connection 10a of the nipple 10 serving for the connection of the capillary tube 3.

The sleeve 7 is preferably formed of plastic because its coefficient of thermal expansion is very large; in fact this coefficient of thermal expansison can be so large that in certain cases there can be dispensed with the use of a filling body or filler 8. In any event, the coefficient of thermal expansion $\alpha 1$ of the sleeve 7, $\alpha 3$ of the compensation medium, and — in the event that a filling body is present — $\alpha 2$ of the filling body 8, and on the other hand the volume Vk of the compartment or space 9 which is in free pressure transmission communication with the previously mentioned volume V, are chosen such that the influence of the disturbing temperature fluctuations upon the apparatus is compensated. This can be expressed in the form of the following equation:

$$Vk = \frac{V \cdot \alpha 3}{(\alpha 1 - \alpha 2)}$$

From the above explanations, it should be readily apparent that the compensation element 6 can serve for the compensation of the influences falsifying the measurement result of long capillary tubes 3 in devices of the above-described type, since the volume of such capillary tube is to be considered part of the volume V. Such compensation element also can be only used for the capillary conduit or sections thereof, so that the compensation element 6 is connected in a manner different than illustrated in FIG. 1, for instance by means of a T-connection element which is placed between sections of the capillary tube 3.

Furthermore, the compensation element as such can be differently constructed for instance as depicted in FIG. 2. The therein portrayed temperature compensation element 11 possesses two body members 12 and 13 which are telescopically inserted within one another, the edges 12a and 13a of which and appearing at their open ends being fixedly coupled with one another by a pipe or tubular element 14. At the base or floor of the outer pot-shaped body member 12 there is secured the one end wall 15a of an aneroid container or cell 15, for instance by soldering, the other end wall 15b of which is fixedly connected by a rod 16 with the floor or base 13b of the inner pot-shaped body member 13. The internal space or compartment 17 of the aneroid container 13 is in free flow communication through the agency of the capillary tube 3 with the volume V of the Bourdon tube-pressure measuring element and contains the same medium, for instance mercury.

The pot-shaped bodies 12, 13 consist of a material, for instance, a plastic having a high coefficient of thermal expansion, whereas on the other hand the tubular element 14 and the rod 16 consist of a material with small coefficient of thermal expansion. The dimensions and coefficients of expansion of such components and the average diameter of the aneroid cell or container 15 are chosen such, while taking into account the coefficient of expansion of the medium contained in the internal space or compartment 17 of the aneroid cell 15, that the influence of the disturbing temperature fluctuations upon the total apparatus is compensated. When such temperature change or fluctuation is constituted for instance by a temperature increase, then the pot-shaped body member 12, 13 experience a considerably greater expansion than the tubular element 14 and the rod 16. The difference of such expansion brings about an increase in the size of the internal compartment or space 17, which is of the same magnitude as the difference of the increase of the total volume of the medium brought about by the expansion less the increase of the total volume V of the Bourdon pressure tube 4 and the capillary tube.

Of course, such compensation element cannot only be employed in conjunction with a temperature measuring device (with external temperature feeler). It can be used in all those instances where the expansion of a liquid owing to temperature fluctuations acts in a disturbing manner upon the function of an instrument or apparatus, for instance apparatuses wherein a pressure feeler or moisture feeler is coupled with the Bourdon tube-pressure measuring element.

Figure 4:
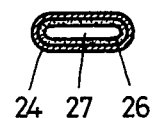
FIG. 4 is a cross-sectional view of a detail of the apparatus depicted in FIG. 3, taken substantially along the line IV—IV thereof.

In FIGS. 3 and 4 there is designated by reference character 21 a housing, by reference character 22 a socket, by reference character 23 a connection nipple, by reference character 24 a primary Bourdon tube serving as a pressure measuring element, by reference character 25 collectively a measurement transmission- and indicating mechanism of a manometer. The internal compartment or space 26 of the Bourdon tube 24 which generally consists of spring steel or stainless steel with a linear coefficient of thermal expansion of about $11.10^{-6}$mm/mm.°C, when there is present contact with mercury, contains the pressurized medium just as the very short channels in the nipple 23 and the socket 24 which have not been shown, and which pressurized medium consists of for instance mercury; additionally it contains as the filling body or filler a series of tablets 27 which, for instance, consist of a steel alloy with 33% nickel, the linear coefficient of expansion of which amounts to about $1.10^{-6}$mm/mm.°C. The total volume of such tablets 27 amount to about 5/6 of the internal compartment 26 of the Bourdon tube 24.

In this manometer, the Bourdon tube 24 not only acts as the pressure measuring element, but also as the sleeve of a thermal compensation element, to which belongs also the medium and the filling body surrounded by the medium and consisting of the plurality of tablets 27.

The dimensions and the coefficients of thermal expansion of such components are accommodated or matched to one another such that the influence of the disturbing temperature fluctuations upon the equipment is compensated. When using the above-mentioned materials, where in particular there is important that of the tablets 27 (filling bodies), such accommodation or matching is undertaken in compliance with the calculations which have been substantiated by a number of trials regarding the proportion of the volume of the filling bodies, in other words the total volume of all tablets 27, the volume of the Bourdon tube-internal compartment 26; such proportion, presupposing the above-indicated selection of materials, amounts to about 5/6. Upon the occurrence of a disturbing temperature increase, the compensation is realized in that the expansion of the mercury which fills the residual portion of the internal compartment 26 is of the same magnitude as the increase of the total volume of such internal compartment.

In the event of a different tube material or medium, the dimensional relationships are correspondingly different. Thus, for instance, when using alcohol as the filling agent the filling body or bodies must fill out about 35/36 of the internal volume of the Bourdon tube.

The tablets possibly can be replaced by flexed sheet metal members or plates which are bent in accordance with the Bourdon tube.

While there is shown and described present preferred embodiments of the invention, it is to be distinctly understood that the invention is not limited thereto, but may be otherwise variously embodied and practiced within the scope of the following claims. Accordingly,

What is claimed is:

1. A measurement apparatus influenced by disturbing ambient temperature fluctuations, said measurement apparatus comprising a limited volume which is filled with a medium subjected to said temperature fluctuations and having a coefficient of thermal expansion, a compensation element which, under the influence of said disturbing temperature fluctuations, alters the size of a compartment forming a part of said limited volume containing the medium and thus alters said limited volume, the dimensions and coefficient of thermal expansion of said compensation element being selected such that, taking into account the coefficient of thermal expansion and the quantity of filling medium contained in said compartment, the increase and decrease in total volume of the limited volume is substantially the same as the expansion and contraction respectively of the filling medium caused by the influence of the disturbing temperature fluctuations upon the apparatus.

2. The apparatus as defined in claim 1, wherein said compensation element comprises a sleeve which at least partially delimits said compartment.

3. The apparatus as defined in claim 2, wherein said sleeve totally delimits said compartment.

4. The apparatus as defined in claim 2, further including a filling body within the sleeve and surrounded by the medium contained therein, said filling body means being accommodated with respect to its coefficient of thermal expansion and size to the sleeve and the medium contained therein such that the influence of the disturbing temperature fluctuations upon the apparatus is compensated.

5. The apparatus as defined in claim 4, wherein said sleeve is formed of plastic.

6. The apparatus as defined in claim 4, wherein the limited volume subjected to temperature fluctuations is approximately completely contained in a Bourdon tube-pressure measuring element, said Bourdon tube-pressure measuring element constituting the sleeve which is part of the compensation element.

7. The apparatus as defined in claim 6, wherein the Bourdon tube-pressure measuring element is formed of steel with a coefficient of expansion of about $11.10^{-6}$ mm/mm.°C and the medium consists of mercury, and further wherein the filling body means comprises a plurality of tablets wherein the volume thereof approximately amounts to 5/6 of the internal volume of the Bourdon tube-pressure measuring element.

8. The apparatus as defined in claim 6, wherein the Bourdon tube-pressure measuring element consists of steel having a coefficient of expansion of about $11.10^{-6}$ mm/mm.°C and the medium consists of mercury, and the filling body means comprises sheet metal strips bent in accordance with the Bourdon tube and composed of a metal alloy with a coefficient of expansion of about $1.10^{-6}$ mm/mm.°C, wherein its volume amounts to about 5/6 of the internal volume of the Bourdon tube-pressure measuring element.

9. The apparatus as defined in claim 1, wherein said compensation element comprises at least two telescopically arranged substantially pot-shaped body members having open ends provided with edge means, a tubular element for connecting the body members with one another at their open edge means, an aneroid cell having an internal space defining said compartment, said aneroid cell having an end wall secured to a base of the outer pot-shaped body member and a further end wall fixedly connected by a rod with a base of the inner pot-shaped body member.

10. The apparatus as defined in claim 9, wherein said body members are formed of plastic.

11. A measurement apparatus adapted to be influenced by ambient temperature fluctuations comprising a limited volume which is filled with a medium subjected to said temperature fluctuations, said limited volume including the internal volume of a Bourdon tube pressure measuring element and a compensation element having a compartment forming a part of said limited volume and also containing said medium, the size of said compartment and thus the volume of said limited volume being variable under the influence of said temperature fluctuations, the dimensions and coefficient of thermal expansion of said compensation element being selected such that taking into account the coefficient of thermal expansion and the quantity of filling medium contained in said compartment, the influence of the temperature fluctuations upon the apparatus is compensated.

12. The apparatus as defined in claim 11, wherein the volume further comprises the internal volume of a capillary tube, and a feeler which is connected by the capillary tube with the Bourdon tube-pressure measuring element.

13. The apparatus as defined in claim 12, wherein said feeler defines an ambient temperature feeler.

14. The apparatus as defined in claim 12, wherein said feeler defines a pressure feeler.

15. The apparatus as defined in claim 12, wherein said feeler defines a moisture feeler.

* * * * *